US 6,726,148 B2

(12) United States Patent
Carroll

(10) Patent No.: US 6,726,148 B2
(45) Date of Patent: Apr. 27, 2004

(54) MANUALLY DISASSEMBLED AND READILY SHIPPABLE MINIATURE, UNMANNED AIRCRAFT WITH DATA HANDLING CAPABILITY

(76) Inventor: Ernest A. Carroll, 12913 Alton Sq., No. 114, Herndon, VA (US) 20170

( * ) Notice: Subject to any disclaimer, the term of this patent is extended or adjusted under 35 U.S.C. 154(b) by 0 days.

(21) Appl. No.: 10/255,182

(22) Filed: Sep. 26, 2002

(65) Prior Publication Data

US 2003/0057325 A1 Mar. 27, 2003

Related U.S. Application Data

(60) Provisional application No. 60/324,931, filed on Sep. 27, 2001.

(51) Int. Cl.[7] .................................................. B64F 5/00
(52) U.S. Cl. ........................ 244/120; 206/335; 244/1 R
(58) Field of Search .......................... 244/117 R, 119, 244/120, 123, 1 R, 190, 3.12; 206/317, 335; 446/34, 88, 93; 89/1.81, 1.804, 1.805

(56) References Cited

U.S. PATENT DOCUMENTS

| 2,360,220 A | * | 10/1944 | Goldman | 244/120 |
|---|---|---|---|---|
| 3,858,349 A | * | 1/1975 | McClendon | 244/120 |
| 4,121,791 A | * | 10/1978 | Taylor et al. | 244/120 |
| 4,530,476 A | * | 7/1985 | Thurber, Jr. et al. | 244/3.21 |
| 4,591,114 A | * | 5/1986 | Block | 244/120 |
| 5,035,382 A | * | 7/1991 | Lissaman et al. | 244/190 |
| 5,087,000 A | * | 2/1992 | Suto | 244/190 |
| 5,119,935 A | * | 6/1992 | Stump et al. | 244/1 R |
| 5,537,909 A | | 7/1996 | Schneider et al. | |
| 5,779,190 A | * | 7/1998 | Rambo et al. | 244/120 |
| 5,918,832 A | * | 7/1999 | Zerweckh | 244/120 |
| 6,062,176 A | | 5/2000 | Berger | |
| 6,094,171 A | * | 7/2000 | Riddle et al. | 343/708 |

OTHER PUBLICATIONS

Jennifer Evans et al "Dragonfly: a versatile uav platform for the advancement of aircraft navigation and control".*
Andreas Parsch "BQM–155" 2002.*

* cited by examiner

Primary Examiner—Galen L. Barefoot
(74) Attorney, Agent, or Firm—David L. Banner

(57) ABSTRACT

A method of shipping a disassembled miniature, unmanned aircraft capable of handling data, the aircraft having remote guidance, an onboard microprocessor for managing flight, wing area of at least eight hundred square inches, a wingspan of at least eight feet, and weighing under fifty-five pounds. The aircraft includes a data handling module. The aircraft is disassembled into separate components including at a minimum the wing, the fuselage, and the data handling module. The fuselage and possibly other lesser components are packed in a first shipping container. The wing is packed in a second shipping container. The data handling module is packed in a third shipping container. The first and second containers are shipped by overnight courier, while the third container is either shipped the same way or alternatively travels as unchecked luggage aboard a commercial airliner.

6 Claims, 3 Drawing Sheets

MANUALLY DISASSEMBLED AND READILY SHIPPABLE MINIATURE, UNMANNED AIRCRAFT WITH DATA HANDLING CAPABILITY

REFERENCE TO RELATED APPLICATION

This application is related to copending applications respectively entitled UNMANNED AIRCRAFT WITH AUTOMATIC FUEL-TO-AIR MIXTURE ADJUSTMENT, Ser. No. 10/255,184; MINIATURE, UNMANNED AIRCRAFT WITH ONBOARD STABILIZATION AND AUTOMATED GROUND CONTROL OF FLIGHT PATH, Ser. No 10/255,183; MINIATURE, UNMANNED AIRCRAFT WITH AUTOMATICALLY DEPLOYED PARACHUTE, Ser. No. 10/255,185; ENGINE DRIVEN SUPERCHARGER FOR AIRCRAFT, Ser. No. 10/255,289; CABLE CONNECTIONS BETWEEN AN UNMANNED AIRCRAFT AND A DETACHABLE DATA HANDLING MODULE, Ser. No. 10/255,187; ELECTRICAL POWER SUPPLY SYSTEM FOR UNMANNED AIRCRAFT, Ser. No. 10/255,188; and MINIATURE, UNMANNED AIRCRAFT WITH INTERCHANGEABLE DATA MODULE, Ser. No. 10/255,186, all filed of even date herewith and which are incorporated herein by reference, and to copending Ser. No. 60/324,931, filed Sep. 27, 2001, which is also incorporated herein by reference.

BACKGROUND OF THE INVENTION

1. Field of the Invention

The present invention relates to miniature, unmanned aircraft, and more particularly to construction of such an aircraft enabling ready assembly and disassembly and shipping by commercial couriers.

2. Description of the Prior Art

Miniature, unmanned aircraft are typically of cruciform configuration when assembled, and are disassembled into two elongate principal components from time to time for storage, transport, and other purposes. It is known to place each of the two components (i.e., wing and fuselage) into separate shipping boxes, with minor components projecting from the fuselage such as landing gear and vertical and horizontal stabilizers removed and packed, so that the disassembled aircraft may be shipped by commercial couriers, particularly those offering overnight transport of freight throughout the United States.

Remotely controlled miniature, unmanned aircraft are very useful in aerial data collection and transmission. It is possible to increase versatility of an airframe used in data collection and transmission when individual data handling devices, such as digital cameras, chemical "sniffers" for identifying airborne chemicals, sensors for sensing magnetic fields or radioactivity, or data transfer devices such as radio frequency receivers and transmitters, are provided as readily replaceable modules. The great versatility of such aircraft may lead to their being sent on different missions to far flung destinations throughout the country and to far parts of the globe, even to the point of being shipped overnight, on short notice.

An aircraft having data handling capabilities may be of fairly great size, for example having a wingspan on the order of seven or eight feet, while being limited in gross weight to fifty-five pounds. Particularly addressing civilian uses in the United States, it is highly desirable to have an unmanned aircraft which is light enough to avoid the fifty-five pound limit which is a threshold above which severe restrictions on use of an aircraft are imposed. It is a great economic and practical advantage to remain free of such requirements. Dimensions and weight of such aircraft present problems for overnight shipping. Complexity of the aircraft and specialized knowledge required to operate the aircraft may require that highly trained, qualified personnel accompany the aircraft to its next mission to assure proper preparation and operation. Hence the aircraft, when broken down into constituent components and packed for shipment, must be compatible with air freight couriers and other modes of expedited shipping.

There exists a need for an aircraft which has interchangeable data handling sensors or transmission capability or both, which remains within the fifty-five pound limitation for avoiding licensing requirements, and which can be readily disassembled and reassembled and shipped by overnight couriers throughout the United States.

SUMMARY OF THE INVENTION

The present invention provides a miniature, unmanned aircraft capable of gathering aerial imagery or transferring data or both, which aircraft can be disassembled readily and packed into three shipping containers for overnight shipping.

Two relatively large containers respectively house the wing and the fuselage. Certain small components which project from the fuselage, such as the horizontal stabilizer and landing gear, may be removed from the fuselage and are packed in either of the two large containers, or alternatively, in a third container.

A data handling module is packed in a third container. Data handling modules include an aerodynamic housing which is attached to and which complements the fuselage when the aircraft is assembled. Each module includes data handling apparatus and supporting hardware in addition to the housing. Data handling apparatus includes sensors and data transmitting apparatus. Examples of sensors include black and white and color video cameras, still frame cameras, multispectral instruments for obtaining multispectral scans, radioactivity sensors, magnetometers, and others. Data handling modules can be of different configurations and dimensions, and hence are typically packaged within their own containers. Although they are capable of being shipped by a commercial overnight shipper, packed modules fall within airline guidelines for checked luggage. This is useful when an aircraft must be accompanied by operating personnel traveling to a distant site of use. The aircraft can thus be shipped to most destinations throughout the United States within twenty-four hours on short notice.

Accordingly, it is one object of the invention to enable disassembling and packing of a miniature, unmanned aircraft capable of handling data, and shipping the packed components by commercial overnight couriers and optionally, one component as checked luggage aboard a commercial airline.

It is another object of the invention to enable a miniature, unmanned aircraft capable of handling data to be shipped to most destinations throughout the United States within twenty-four hours on short notice.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
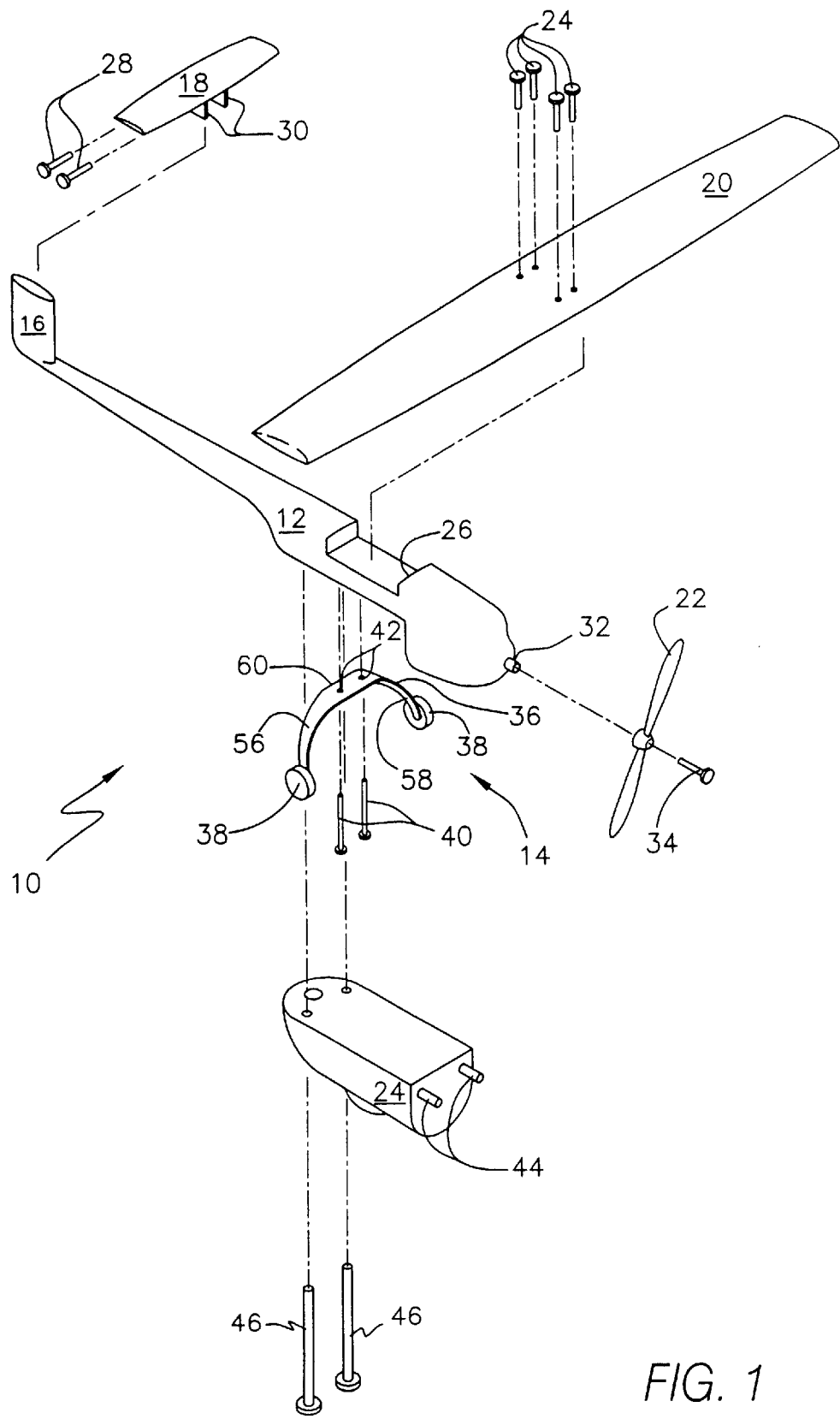
FIG. 1 is an exploded perspective view of a data handling aircraft which may be packed and transported according to the present invention.

Turning now to FIG. 1 of the drawings, miniature, unmanned data handling aircraft 10 is shown in a manner revealing significant components which are separated when aircraft 10 is to be packed for overnight shipment to destinations throughout the United States. Aircraft 10 has a fuselage 12, landing gear 14, a vertical stabilizer 16, a horizontal stabilizer 18, a wing 20, and a propeller 22. Wing 20 is constructed to have dihedral characteristics disposed to promote flight stability, effective lift area in the range of at least eight hundred square inches and potentially up to twelve hundred square inches, and length of at least eight feet and potentially as much as ten feet.

Aircraft 10 also has a remote guidance system including an onboard microprocessor for managing flight, an engine drivably connected to propeller 22, an associated fuel supply system, a radio frequency receiver connected to the microprocessor, flight control surfaces and servomechanisms disposed to operate the flight control surfaces, wherein the servomechanisms are connected to and under the control of the microprocessor, and flight stability sensors connected to the microprocessor (none shown). The components not illustrated herein are described in greater detail in the copending applications listed under the section entitled "REFERENCE TO RELATED APPLICATION", to which the reader is referred.

The primary mission of aircraft 10 is to gather and transmit digital data. To this end, aircraft 10 has a mission data handling module 24, for gathering aerial data or transmitting data or both. Designation of module 24 being for mission data is for semantic convenience. It is possible that some data handling devices such as flight stabilization data sensors will be mounted in module 24 as well as one or more sensors for gathering data relating to the mission of aircraft 10.

As has been stated before, it is desired to limit weight of aircraft 10 to under fifty-five pounds. The nature of data handling module 24 and construction enabling weight to be limited to fifty-five pounds despite the many features of aircraft 10 are particularly set forth in the copending application entitled MINIATURE, UNMANNED AIRCRAFT WITH INTERCHANGEABLE DATA MODULE, Serial Number. Details of the flight control system are more particularly detailed in the copending application entitled MINIATURE, UNMANNED AIRCRAFT WITH ONBOARD STABILIZATION AND AUTOMATED GROUND CONTROL OF FLIGHT PATH, Serial Number.

Provision of the features listed above will of course be understood to encompass all necessary elements for operability, such as attachment in appropriate location, fasteners, communication and power connections, and the like regardless of whether such elements are explicitly recited.

Aircraft 10 is disassembled at a minimum into the components shown in FIG. 1. Assembly and disassembly are accomplished with readily installed and removed fasteners. As employed herein, such fasteners may be operated directly by and or alternatively by ordinary hand tools (not shown). Wing 20 attaches to fuselage 12 by bolts 24, preferably seating within a recess 26. Wing 20 has a downwardly oriented projection (not visible in the depiction of FIG. 1) which interfits in close cooperation with recess 26. Horizontal stabilizer 18 attaches to vertical stabilizer 16 by bolts 28 which pass through holes (not visible) formed in tabs 30 formed in stabilizer 18. Alternatively, tabs (not shown) could be formed in vertical stabilizer 16. Propeller 22 is secured to engine output shaft 32 by a screw 34. Landing gear assembly 14 comprises a U-shaped bracket 36 on which are mounted wheels 38. Bracket 36 mounts to the bottom surface of fuselage 12 by bolts 40 which pass through holes 42 and which thread into threaded holes or anchors (not visible in FIG. 1) located on fuselage 12.

Data handling module 24, which may be of any type described in the referenced copending application, attaches to fuselage 12 by first inserting dowels 44 into corresponding holes (not visible in FIG. 1) formed in fuselage 12. Threaded fasteners 46 are then tightened to fuselage 12. Although as depicted in FIG. 1 as passing vertically through module 24, it is preferred that module 24 be provided with tabs (not shown) which engage lateral surfaces of fuselage 12, with bolts 46 being inserted from the side to pass through the tabs into threaded holes or anchors (not shown) formed in fuselage 12. Thus wing 20, landing gear 14, horizontal stabilizer 18, and mission data handling module 24 are readily attached to and removed from the fuselage by manual fasteners.

Figure 2:
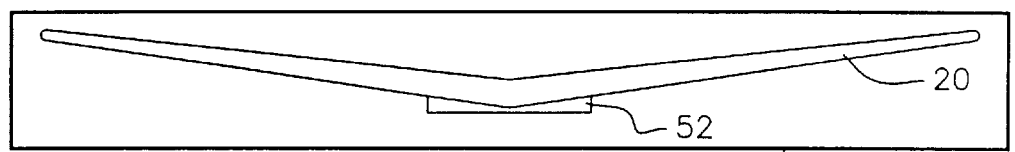
FIG. 2 is a diagrammatic, front elevational view of the wing contained within its associated shipping container.
Figure 3:
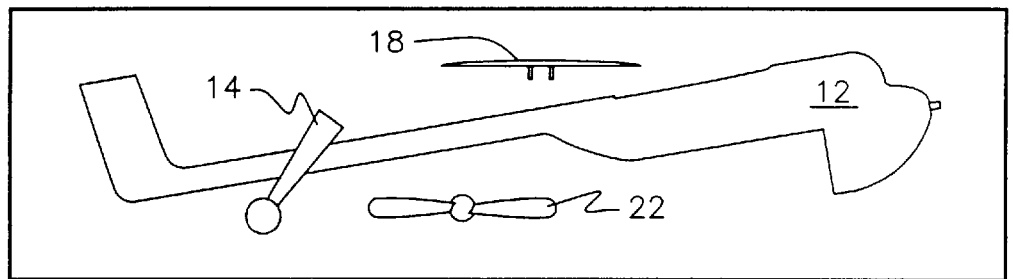
FIG. 3 is a diagrammatic, front elevational view of the fuselage and certain smaller components of the aircraft, contained within an associated shipping container.
Figure 4:
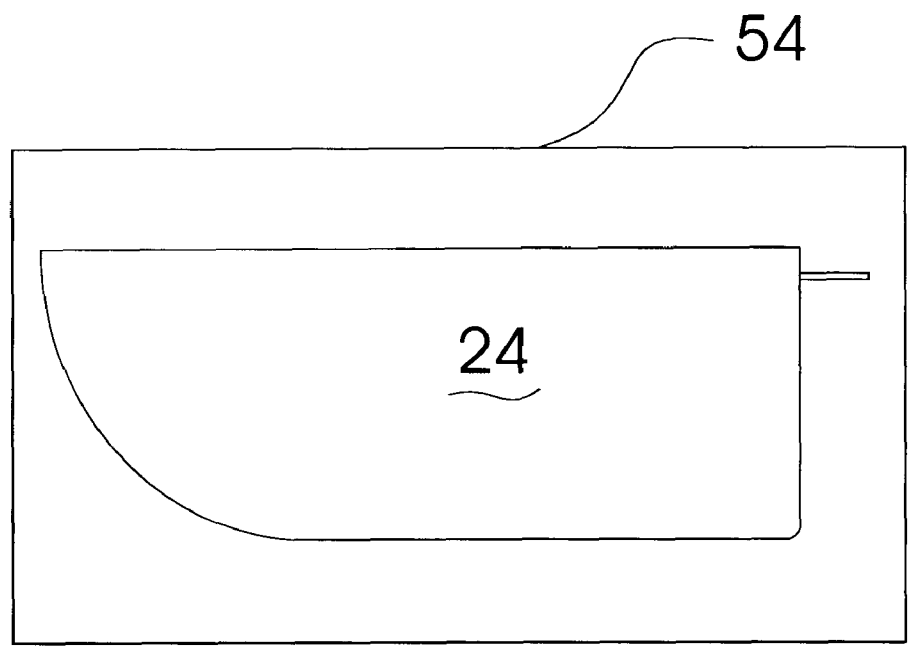
FIG. 4 is a diagrammatic, side elevational view of a data handling component borne in an aerodynamic housing which during flight is attached to the fuselage, contained within an associated shipping container.

Aircraft 10 is disassembled into the separate components shown in FIG. 1. Referring to FIGS. 2–4, fuselage 12, landing gear 14, and horizontal stabilizer 18 are placed into a first shipping container 48 which preferably is dimensioned and configured to receive and fully enclose these items. Although small enough to be packed elsewhere, propeller 22 may also placed into container 48.

It will be apparent from examining FIG. 1 that landing gear 14 is configured as being U-shaped, having two legs 56, 58 and a connecting member 60. It is also seen that the rear end of fuselage 12 is relatively narrow relative to the front end bearing propeller 22. Legs 56, 58 are spaced apart sufficiently to enable landing gear 14 to straddle the narrow end of fuselage 12 when removed from fuselage 12. Landing gear 14 is preferably packed within container 48 in a position wherein legs 56, 58 straddle fuselage 12 (see FIG. 3).

Wing 20 is placed into a second shipping container 50 dimensioned and configured to receive and fully enclose wing 20. Dihedral characteristics are shown exaggeratedly in the depiction of FIG. 2. The actual angle formed by right and left sections of wing 20 is on the order of approximately 178 or 179 degrees. Nonetheless, over the considerable length of wing 20, the total package thickness, taken together with length and width, comes close to present courier tolerances for maximum shipping container dimensions. The downward projection 52 of wing 20 is visible in FIG. 2.

Data handling module 24 is placed into a third shipping container 54 dimensioned and configured to receive and fully enclose the mission data handling module. Shipping containers 48, 50, and 54 are preferably of types intended for protecting delicate articles when shipped by common carriers. For example, they may be provided with sturdy outer cases and synthetic foam interior linings (neither shown) adapted to cooperate with packed articles.

After receiving the various components as described, any of containers 48, 50, and 54 may be shipped as freight unaccompanied by a paying passenger by an overnight commercial courier. This is in the manner of many packages which are shipped overnight throughout the United States on freight carrying aircraft which do not also offer passenger fare on a commercial basis. Whenever operating personnel or any personnel otherwise tasked with contributing to use of the aircraft by providing instruction or actual operating services, or in other ways must accompany aircraft 10 to a distant destination, as for instructing local users and operating the aircraft, it is preferred to ship containers 48 and 50 by overnight freight couriers, and to ship container 54 simultaneously as checked luggage on the commercial airline flight carrying accompanying personnel. As employed herein, "simultaneously" will be taken to signify that the shipped items arrive at a common destination on the same calendar day. The common destination is one advertised to the general public using essentially a commonly used term, such as the name of a town, city, island, established geographic demographic market, or other limited region or political subdivision smaller than a state of the United States. The destination encompasses that area or region served by the destination to which the shipping containers are being shipped.

It is to be understood that the present invention is not limited to the embodiments described above, but encompasses any and all embodiments within the scope of the following claims.

I claim:

1. A method of packing a miniature, unmanned, data handling aircraft for overnight shipment to destinations throughout the United States, comprising the steps of:

providing a miniature, unmanned aircraft having a fuselage, landing gear, a vertical stabilizer, a horizontal stabilizer, a wing constructed to have effective lift area of at least eight hundred square inches and length of at least eight feet, a remote guidance system including an onboard microprocessor, an engine drivably connected to a propeller and an associated fuel supply system, a radio frequency receiver connected to the microprocessor, flight control surfaces and servomechanisms disposed to operate the flight control surfaces, and a mission data handling module having a housing and a data handling apparatus contained within the housing, wherein the gross weight of the aircraft is limited to be less than fifty-five pounds; providing connections enabling the wing, the landing gear, the horizontal stabilizer, and the mission data handling module to be readily attached to and removed from the fuselage; disassembling the aircraft into separate components including at least the wing, the fuselage, and the mission data handling module; and providing a first shipping container dimensioned and configured to receive and fully enclose at least the fuselage, a second shipping container dimensioned and configured to receive and fully enclose at least the wing, and a third shipping container dimensioned and configured to receive and fully enclose at least the mission data handling module, each of said first, second, and third shipping containers being dimensioned and configured for shipment by an overnight commercial courier air freight service.

2. The method according to claim 1, comprising the further step of shipping at least one of the first shipping container, the second shipping container, and the third shipping container as freight unaccompanied by a paying passenger by an overnight commercial courier, while simultaneously shipping at least one of the first shipping container, the second shipping container, and the third shipping container as checked luggage accompanied by a paying passenger on a commercial airline.

3. The method according to claim 2, comprising the further step of accompanying at least one of the first shipping container, second shipping container, and the third shipping container shipped as checked luggage by a person tasked with contributing to use of the aircraft at the region served by the destination to which said first shipping container, said second shipping container, and said third shipping container are being shipped.

4. The method according to claim 1, comprising the further step of shipping the landing gear and the horizontal stabilizer in the first shipping container together with the fuselage.

5. The method according to claim 1, comprising the further steps of configuring the fuselage to be relatively wide at one end and relatively narrow at the other end; configuring the landing gear as a U-shaped assembly having two legs and a connecting member, wherein the two legs are spaced apart sufficiently to enable the landing gear to straddle the narrow end of the fuselage when the landing gear is removed from the fuselage; and packing the landing gear within the first shipping container in a position wherein the legs of the landing gear straddle the fuselage.

6. The method according to claim 1, wherein said step of providing a miniature, unmanned aircraft comprises the further steps of placing the servomechanisms and the flight stability sensors under the control of the microprocessor when the aircraft is assembled.

* * * * *